WAVE GUIDE FREQUENCY CONVERTER

Filed April 29, 1953

INVENTOR
A. L. HOPPER
BY Hugh S. Wertz
ATTORNEY 2,806,138

WAVE GUIDE FREQUENCY CONVERTER

Andrew L. Hopper, Summit, N. J., assignor to Bell Telephone Laboratories, Incorporated, New York, N. Y., a corporation of New York Application April 29, 1953, Serial No. 351,945

2 Claims. (Cl. 250—20)

This invention relates to frequency converters and more particularly to microwave frequency converters and is a continuation-in-part of copending application Serial No. 268,979, filed January 30, 1952.

An object of this invention is to provide a novel frequency converter in which two heterodyning frequencies beating together to produce an output frequency may be separated by a difference in frequency that is of the order of magnitude of one of the heterodyning frequencies.

Another object is to provide a simplified all wave guide frequency converter.

A further object is to provide a frequency converter having improved band width and efficiency.

The principle of frequency conversion by which two frequencies are heterodyned together to produce a third frequency which may be the sum or difference of the first two is well known to the art. So far as is known, however, the practical application of this principle to two microwave frequencies differing from each other by a relatively large frequency has not been achieved before principally because of the difficulty of obtaining a uniformly low loss over a large band width while at the same time maintaining satisfactory frequency selectivity at each terminal of the converter. The present invention, in one of its more important aspects, is directed to a solution of this difficulty.

One illustrative embodiment of the present invention consists of a T-junction of three conductively bounded wave guides together with a non-linear conductor, such as a crystal diode, positioned within the junction. By properly proportioning the dimensions of the junction with respect to the location of the non-linear conductor, this embodiment can be arranged for use as a frequency converter in which two electric waves of very different frequencies applied to the junction via their respective wave guides generate an electric wave having a frequency which is either the sum or difference of the applied frequencies, the generated wave being extracted from the junction by the remaining wave guide. Such an arrangement permits the use, for example, of frequencies in the ratio of 2:3:5 having a relative frequency band width as great as one-quarter. Moreover, the insertion loss over the pass band can be as low as several decibels.

A more complete understanding of the nature of this invention together with a better appreciation of its advantages will best be gained from a study of the following description given in connection with the accompanying drawings in which.

In these drawings the same reference numeral will be appended to its designated part in each figure in which the part can be seen.

Figures 1, 2, 3:
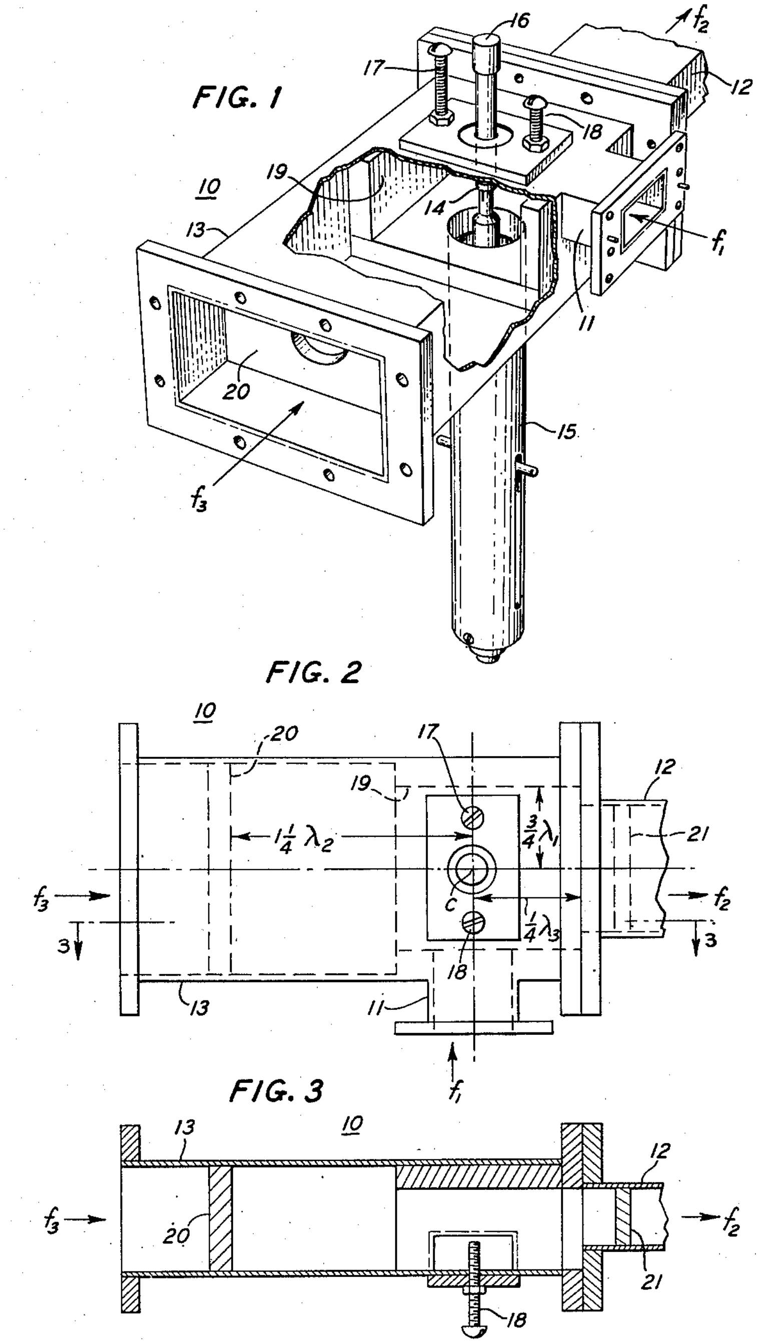
Fig. 1 is a perspective view, shown for purposes of illustration, of one embodiment of the present invention consisting of a wave guide shunt T-junction within which is positioned a crystal diode.
Fig. 2 is a top view of the embodiment shown in Fig. 1.
Fig. 3 is a side section view taken as indicated in Fig. 2.

Referring now particularly to the drawings, Figs. 1, 2 and 3 show in different views a shunt T-junction 10 of three rectangular wave guides 11, 12, and 13. Crystal diode 14 is positioned within the junction so that its axis perpendicularly intersects the center line of each of these guides. The inside dimensions, chosen according to formulae well known to the art and which will not be given here, of each of these guides are such that each propagates a wave in the fundamental transverse electric mode at a respective one of the frequencies $f_1$, $f_2$, and $f_3$ as indicated in the drawings. Power flow into and out of the junction 10 is indicated by arrows pointing in the direction of power flow. These directions are not unique, however, because, due to reciprocity, power may flow out of the converter through any one of the three arms, provided only that sufficient power flows into the remaining two. It should be noted that this feature makes possible without modification the use of this embodiment either as a frequency-sum or as a frequency-difference converter.

The perpendicular intersection of the line of center of guide 11 with a plane containing the line of center of guides 12 and 13 is designated point C in Fig. 2. Crystal diode 14 is preferably, though not necessarily, located along a line through this point perpendicular to the lines of centers so that current flowing in the crystal as a result of signal waves applied to two of the junction guides flows parallel to the electric fields. Tuning stub 15 shown in Fig. 1 is provided as a means for maximizing the excitation of this crystal, while handle 16 serves as a means for moving the crystal parallel to its axis. Neither stub 15 nor handle 16 is necessary, however, for the operation of converter 10. Tuning screws 17 and 18 provide an effective way of eliminating spurious resonances within the junction cavity and in addition they provide a measurable increase in converter efficiency. The distance these screws extend into the junction cavity can best be determined by simple experiment and for this reason it is desirable they be made adjustable. They are positioned perpendicularly intersecting the center line of guide 11 approximately one-half of $\lambda_1$, $\lambda_1$ is the guide wavelength of the signal having a frequency $f_1$, on either side of the center line of guides 12 and 13.

Within the junction and perpendicular to the center line of guide 11 a conducting surface 19 is positioned so that a wave entering the junction via guide 11 will be reflected in phase with itself at the crystal axis through point C. To accomplish this, surface 19 is spaced an odd number of quarter wavelengths of $\lambda_1$, for example three-quarters $\lambda_1$ shown in Fig. 2, from point C. The surface opposite surface 19 may be positioned symmetrically with respect to point C and surface 19. The inside height of surface 19 is not critical but a value roughly three-quarters $\lambda_1$ has been found satisfactory. A wave reflecting element 20 is located in guide 13 opposite guide 12 an odd number of quarter wavelengths of $\lambda_2$, the guide wavelength of the signal of frequency $f_2$, from point C, for example one and one-quarter $\lambda_2$ shown in Fig. 2, for a similar reason. This wave reflecting element may be of any suitable structure such as a resonant iris shown in Fig. 8.5–11($f$), page 255 of "Principles and Applications of Waveguide Transmission" by G. C. Southworth, Van Nostrand Company, 1950. It should be adjusted to pass substantially only the band of frequencies centered around frequency $f_3$. The junction of guide 12 with the T-cavity is made an odd number of quarter wavelengths of $\lambda_3$, the guide wavelength of the signal of frequency $f_3$, distant from point C, for example one-quarter $\lambda_3$ shown in Fig. 2, again for the same reason.

In general it is advantageous to insert frequency restrictive elements in certain arms of the T-junction in order to suppress undesirable feed through of power from one arm to another. It is not usually necessary, however, to insert a filter in every arm of the junction since the lower cut-off frequency of one of the arms is ordinarily high enough to suppress unwanted frequencies therein. This arm, in the embodiment illustrated, would correspond to guide 11. In order to prevent frequency $f_1$ from feeding through into arm 12, filter 21, similar to element 20, may be inserted therein and adjusted to pass only the band of frequencies centered around frequency $f_2$. Reflecting element 20 effectively suppresses frequency $f_1$ in arm 13 in addition to reflecting signals back to point C.

Assuming power flows to and from the converter in the directions indicated by the arrows in Fig. 1, the signals applied by arms 11 and 13 induce in crystal 14 sideband frequencies one of which is the sum of the frequencies $f_1$ and $f_3$ and the other is the difference. One of these induced frequencies is then extracted from the converter by arm 12. For the structure as shown in the drawings, the induced frequency $f_2$ would be the difference of frequencies $f_1$ and $f_3$.

If a frequency band width greater than that of filters 20 and 21 is desired, they may be replaced by the electrically variable iris shown in Figs. 3A and 3B in the above copending application or, if preferred, filter 21 may be omitted altogether and a coaxial-line-to-rectangular-wave-guide transducer substituted for element 20. Amplitude control of the output signal from the converter is readily obtained by a direct-current bias applied to crystal 14. Lastly, any suitable non-linear conductor may be used in the place of crystal diode 14.

The foregoing description is intended to be in illustration and not in limitation of this invention. Although the embodment illustrated is substantially the same as one which has been built to operate with frequencies of 4, 6, and 10K mc. and a band width of 500 megacycles, the invention is not limited in any way to these frequencies or this band width. In addition to the modifications which have been mentioned in the foregoing, other changes or rearrangements will occur to those skilled in the art and may be made without departing from the spirit or scope of this invention.

What is claimed is:

1. A microwave frequency broadband converter for intermodulating two broadband microwave frequency signals centered about carrier frequencies, the higher carrier frequency of which may be from fifty to one hundred and fifty per cent or more greater than the lower carrier frequency, said converter also facilitating the isolation of specific broadband modulation products of said intermodulation, said converter comprising a rectangular wave guide T-junction having three arms of rectangular cross section, one cross-sectional dimension of each arm being substantially twice its other cross-sectional dimension, the longitudinal axes of said three arms lying in a common plane, two of said arms having a common longitudinal axis, the axis of the third of said arms perpendicularly intersecting the common axis of the said other two arms, said three arms having substantially differing cross-sectional dimensions as required, respectively, for the transmission of the fundamental transverse electric mode of the lower frequency microwave signal, the fundamental transverse electric mode of the higher frequency microwave signal and the fundamental transverse electric mode of a modulation product microwave signal resulting from intermodulation of said first mentioned two signals, said converter further including an electrically non-linear element positioned substantially at the said point of intersection of the axes of said three arms, whereby when microwave signals of the appropriate fundamental transverse electric modes are introduced into any two of said three arms they will be intermodulated by said non-linear element to produce modulation products which will be transmitted from said converter through the third arm in the fundamental transverse electric mode of propagation for said third arm.

2. The converter of claim 1, said T-junction including an element opposite the orifice of each arm of said junction, in a plane perpendicular to the axis of said arm and at a distance beyond said intersection point of the axes of said arms, said distance being an odd number of quarter wavelengths of the median frequency of the fundamental transverse electric mode signal which said arm is proportioned to transmit, said element constituting an efficient reflector of said fundamental transverse electric mode signal associated with said arm.

References Cited in the file of this patent

UNITED STATES PATENTS

| | | |
|---|---|---|
| 2,253,589 | Southworth | Aug. 26, 1941 |
| 2,496,521 | Dicke | Feb. 7, 1950 |
| 2,514,678 | Southworth | July 11, 1950 |
| 2,666,134 | Dicke | Jan. 12, 1954 |

OTHER REFERENCES

"Microwave Converters," by C. F. Edwards; Bell Telephone System Technical Publications, Monograph B-1495; Proc. I. R. E., vol. 35, pages 1181 to 1191, November 1947. (Copy in Div. 51.)